United States Patent
Seki

(10) Patent No.: US 8,395,423 B2
(45) Date of Patent: Mar. 12, 2013

(54) SWITCHING CONTROL CIRCUIT AND SWITCHING POWER SUPPLY CIRCUIT

(75) Inventor: Masao Seki, Gunma-ken (JP)

(73) Assignee: ON Semiconductor Trading, Ltd., Hamilton (BM)

(*) Notice: Subject to any disclaimer, the term of this patent is extended or adjusted under 35 U.S.C. 154(b) by 143 days.

(21) Appl. No.: 13/168,564

(22) Filed: Jun. 24, 2011

(65) Prior Publication Data

US 2011/0316607 A1  Dec. 29, 2011

(30) Foreign Application Priority Data

Jun. 25, 2010  (JP) ................................. 2010-145288

(51) Int. Cl.
*H03K 3/00* (2006.01)
(52) U.S. Cl. ...................................... 327/112; 327/108
(58) Field of Classification Search .......... 327/374–377, 327/112
See application file for complete search history.

(56) References Cited

U.S. PATENT DOCUMENTS

| | | | |
|---|---|---|---|
| 7,049,862 B2 * | 5/2006 | Inoue | 327/110 |
| 7,075,355 B2 * | 7/2006 | Furuie et al. | 327/434 |
| 7,642,817 B2 * | 1/2010 | Jasberg et al. | 327/108 |
| 7,710,167 B2 * | 5/2010 | Bernacchia | 327/108 |

OTHER PUBLICATIONS

English translation for Japanese Publication No. 2006-014559 Published Jan. 12, 2006 (13 pages).

* cited by examiner

*Primary Examiner* — Hai L Nguyen
(74) *Attorney, Agent, or Firm* — Osha Liang LLP

(57) ABSTRACT

A switching-control circuit, which causes a first transistor, having an input electrode to be applied with an input voltage and an output electrode connected to an inductor and a diode, to be turned on and kept on for a predetermined time period, includes: a comparison circuit to compare a feedback voltage corresponding to an output voltage with a reference voltage; a detecting circuit to detect a switching period of the first transistor; and a driving circuit to turn off a second transistor connected in parallel to the diode as well as turn on the first transistor to be kept on for the predetermined time period, and thereafter, turn off the first and second transistors, when the feedback voltage becomes lower than the reference voltage, and turn off the first transistor as well as turn on the second transistor, when the switching period becomes longer than a predetermined period.

6 Claims, 6 Drawing Sheets

US 8,395,423 B2

SWITCHING CONTROL CIRCUIT AND SWITCHING POWER SUPPLY CIRCUIT

CROSS-REFERENCE TO RELATED APPLICATION

This application claims the benefit of priority to Japanese Patent Application No. 2010-145288, filed Jun. 25, 2010, of which full contents are incorporated herein by reference.

BACKGROUND OF THE INVENTION

1. Field of the Invention

The present invention relates to a switching control circuit and a switching power supply circuit.

2. Description of the Related Art

A ripple converter is known as a switching power supply circuit that generates an output voltage of a target level out of an input voltage (see, e.g., Japanese Laid-Open Patent Publication No. 2006-14559). FIG. 6 is a diagram illustrating an example of a common ripple converter 100 that employs a fixed-on-time system. A control circuit 110 turns on an NMOS transistor 120 to be kept on for a predetermined time period, when a feedback voltage Vfb that corresponds to an output voltage Vout becomes lower than a reference voltage Vref. As a result, the output voltage Vout is increased. When the output voltage Vout is reduced due to the influence of a load 150 and the feedback voltage Vfb becomes lower than the reference voltage Vref, the control circuit 110 again turns on the NMOS transistor 120 to be kept on for the predetermined time period. These operations are repeated, so that the output voltage Vout of a target level is generated.

The output voltage Vout of the ripple converter 100 is more mildly reduced as the load current of the load 150 becomes smaller, and thus the switching period of the NMOS transistor 120 becomes longer. In other words, the switching frequency of the ripple converter 100 is reduced when the load current becomes smaller. Therefore, when the load current is reduced and the switching frequency is reduced to a frequency in the audible range, for example, noise may be generated from the ripple converter 100. Therefore, for example, the control circuit 110 is designed so as not to cause the switching frequency to become lower than or equal to a predetermined frequency that is higher than the audible range.

When the control circuit 110 as described above is used, the switching frequency never becomes lower than or equal to the predetermined frequency, thereby suppressing the generation of noise, for example. However, even in the case where the output voltage Vout is not reduced substantially, the control circuit 110 may turn on the NMOS transistor 120, thereby causing a problem that the output voltage Vout is increased from the target level.

SUMMARY OF THE INVENTION

A switching control circuit according to an aspect of the present invention, which performs switching so as to cause a first transistor to be turned on and kept on for a predetermined time period, in order to generate an output voltage of a target level out of an input voltage, the first transistor having an input electrode to be applied with the input voltage and an output electrode connected to an inductor and a diode, the switching control circuit includes: a comparison circuit configured to compare a feedback voltage corresponding to the output voltage with a reference voltage; a detecting circuit configured to detect whether a switching period of the first transistor is longer than a predetermined period; and a driving circuit configured to turn off a second transistor connected in parallel to the diode as well as turn on the first transistor to be kept on for the predetermined time period, and thereafter, turn off the first transistor and the second transistor, when the feedback voltage becomes lower than the reference voltage, and turn off the first transistor as well as turn on the second transistor, when the switching period becomes longer than the predetermined period.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
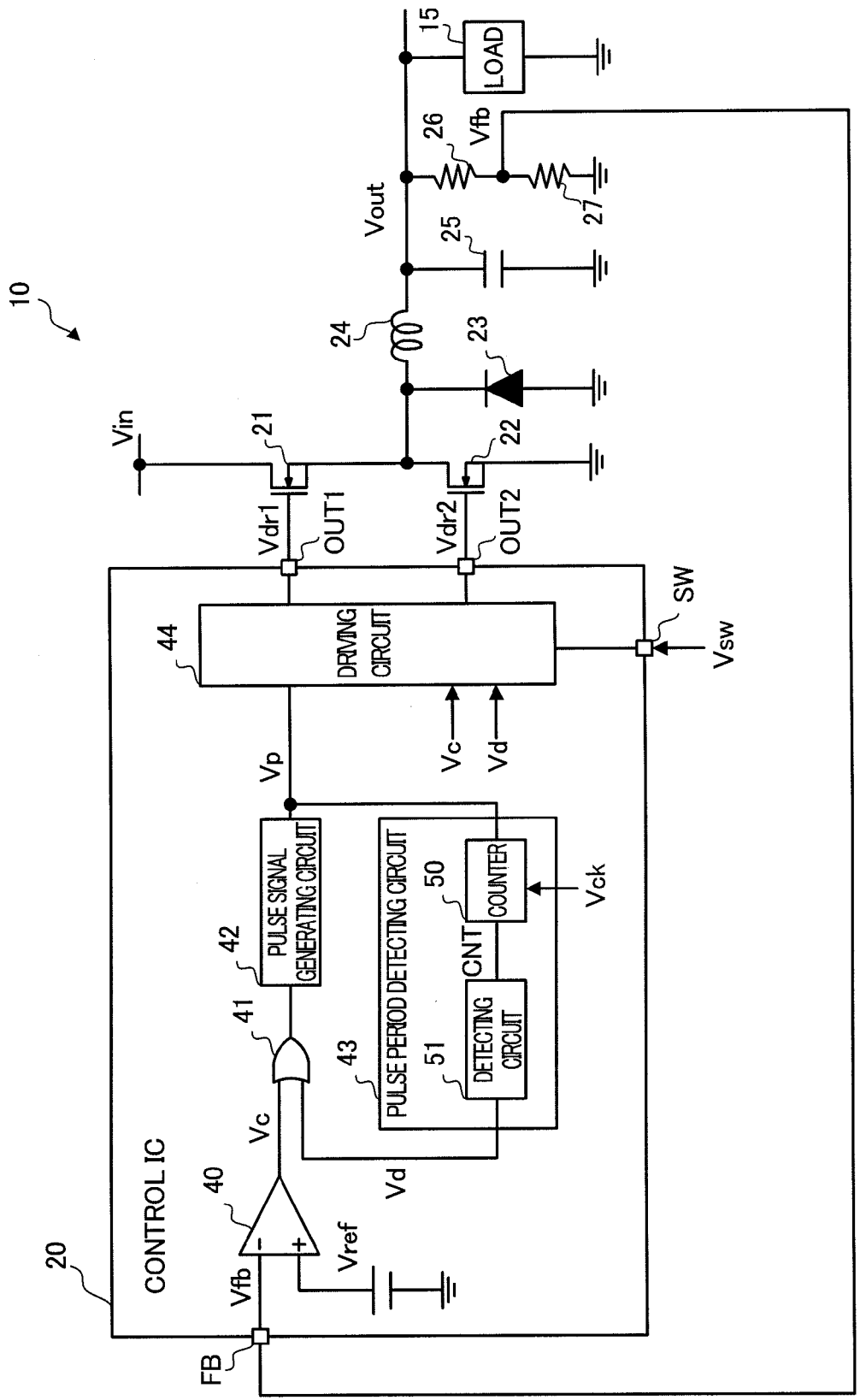
FIG. 1 is a diagram illustrating a configuration of a ripple converter 10 according to an embodiment of the present invention.

FIG. 1 is a diagram illustrating a configuration of a ripple converter 10 according to an embodiment of the present invention. The ripple converter 10 is a circuit configured to generate an output voltage Vout of a target level out of an input voltage Vin, and includes a control IC (Integrated Circuit) 20, NMOS transistors 21 and 22, a diode 23, an inductor 24, a capacitor 25, and resistors 26 and 27, for example. The ripple converter 10 operates as a power supply circuit, which employs a synchronous rectification system or a diode rectification system, based on an instruction from a microcomputer (not depicted). The control IC 20, the NMOS transistor 22, and the diode 23 correspond to a power supply circuit.

A load 15 is an integrated circuit such as a CPU (Central Processing Unit), and operates using the output voltage Vout as a power supply voltage. In an embodiment of the present invention, it is assumed that a current flowing through the load 15 is a load current.

The control IC 20 (switching control circuit) is an integrated circuit configured to switch the NMOS transistors 21 and 22 based on a feedback voltage Vfb which is acquired by dividing the output voltage Vout using the resistors 26 and 27. The control IC 20 includes terminals FB, SW, OUT1, and OUT2.

The terminal FB is applied with the feedback voltage Vfb. The terminal SW is input, from a micro computer (not depicted), for example, with a switching signal Vsw for causing the ripple converter 10 to operate as the power supply circuit which employs the synchronous rectification system or the diode rectification system.

The terminal OUT1 is connected to a gate electrode of the NMOS transistor 21. The terminal OUT2 is connected to a gate electrode of the NMOS transistor 22.

The control IC 20 includes a comparator 40, an OR circuit 41, a pulse signal generating circuit 42, a pulse period detecting circuit 43, and a driving circuit 44. The OR circuit 41, the pulse signal generating circuit 42, and the driving circuit 44 correspond to a driving circuit.

The comparator 40 (comparison circuit) compares the feedback voltage Vfb with a predetermined reference voltage Vref and outputs a comparison voltage Vc indicative of a comparison result. The comparator 40 outputs the comparison voltage Vc of a low level (hereinafter referred to as "L" level or low) when the feedback voltage Vfb is higher than the reference voltage Vref, and outputs the comparison voltage Vc of a high level (hereinafter referred to as "H" level or high) when the feedback voltage Vfb is lower than the reference voltage Vref.

The OR circuit 41 performs an operation of the logical sum of the comparison voltage Vc and a voltage Vd that is output from the pulse period detecting circuit 43.

The pulse signal generating circuit 42 is a so-called one-shot circuit and generates a pulse signal Vp, which is high only for a predetermined time period T1, when the output of the OR circuit 41 goes high.

The pulse period detecting circuit 43 (detecting circuit) detects whether a pulse period (switching period), in which the pulse signal Vp is generated, is longer than a predetermined period TA, and when the pulse period is longer than the predetermined period TA, the circuit causes the pulse signal generating circuit 42 to generate the pulse signal Vp. The pulse period detecting circuit 43 includes a counter 50 and a detecting circuit 51.

The counter 50 is an up-counter configured to increment a count value CNT in synchronization with a clock signal Vck input thereinto. The count value CNT is reset when the pulse signal Vp goes high. In an embodiment of the present invention, it is assumed that the period of the clock signal Vck to be input to the counter 50 is sufficiently shorter than the predetermined period TA.

When the count value CNT reaches a predetermined value that is indicative of the predetermined period TA, that is, when the pulse period is longer than the predetermined period TA, the detecting circuit 51 outputs the voltage Vd of "H" level. When the count value CNT is smaller than the predetermined value, the detecting circuit 51 outputs the voltage Vd of "L" level. That is, when the detecting circuit 51 detects that the pulse period is longer than the predetermined period TA, the detecting circuit 51 causes the pulse signal generating circuit 42 to generate the pulse signal Vp. Therefore, in an embodiment of the present invention, even when the comparison voltage Vc is low, the pulse signal Vp is generated in substantially every predetermined period TA.

When the pulse signal Vp is input to the driving circuit 44, the driving circuit 44 drives the NMOS transistors 21 and 22 based on the switching signal Vsw, the comparison voltage Vc, and the voltage Vd. More specifically, when the switching signal Vsw is high, for example, the driving circuit 44 turns on/off the NMOS transistors 21 and 22 in a complementary manner based on the pulse signal Vp. When the switching signal Vsw is high, the driving circuit 44 causes the NMOS transistors 21 and 22 to operate as a synchronous rectification circuit.

On the other hand, in the case where the switching signal Vsw is low, for example, when the comparison voltage Vc goes high, the driving circuit 44 causes the NMOS transistors 21 and 22 to operate as a synchronous rectification circuit. In the case where the switching signal Vsw is low, when the voltage Vd goes high, the driving circuit 44 causes the NMOS transistors 21 and 22 and the diode 23 to operate as a diode rectification circuit. The driving circuit 44 will be described later in detail.

The NMOS transistor 21 (first transistor) is a high-side (power-supply side) power transistor, and a drain electrode (input electrode) thereof is applied with the input voltage Vin and a source electrode (output electrode) thereof is connected to a drain electrode of the NMOS transistor 22.

The NMOS transistor 22 (second transistor) is a low-side (ground side) power transistor, and a source electrode thereof is grounded and a drain electrode thereof is connected to the inductor 24.

The diode 23 is a body diode of the NMOS transistor 22. The inductor 24 and the capacitor 25 make up an LC filter that smoothes the voltage at the node at which the NMOS transistors 21 and 22 are connected to each other.

==Details of Driving Circuit 44==

Figure 2:
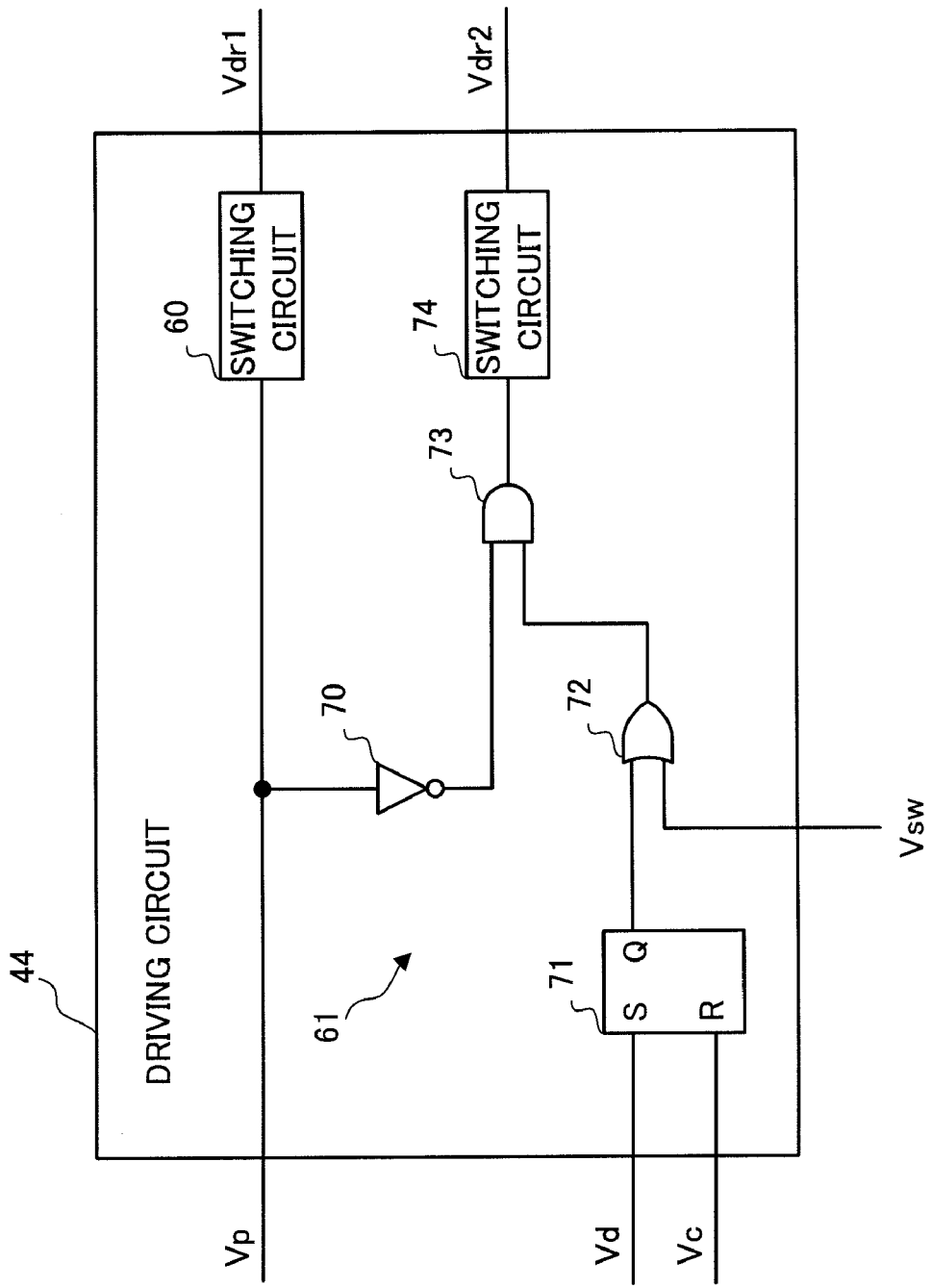
FIG. 2 is a diagram illustrating a configuration of a driving circuit 44.

A specific configuration of the driving circuit 44 will be described with reference to FIG. 2. The driving circuit 44 includes a switching circuit 60 that corresponds to a so-called high-side driver, and a low-side driver 61.

The switching circuit 60 drives the NMOS transistor 21 based on the pulse signal Vp. More specifically, while the pulse signal Vp is high, the switching circuit 60 outputs a driving signal Vdr1 of "H" level, so as to turn on the NMOS transistor 21. On the other hand, while the pulse signal Vp is low, the switching circuit 60 outputs the driving signal Vdr1 of "L" level, so as to turn off the NMOS transistor 21. In an embodiment of the present invention, it is assumed that, for example, a voltage from a bootstrap circuit (not depicted), which boosts the input voltage Vin, is supplied to the switching circuit 60, so that the switching circuit 60 can perform switching for the NMOS transistor 21.

The low-side driver 61 includes an inverter 70, an RS flip-flop 71, an OR circuit 72, an AND circuit 73, and a switching circuit 74.

The inverter 70 inverts the logical level of the pulse signal Vp and outputs the signal of the inverted level. The RS flip-flop 71 sets a Q output thereof at "H" level when the voltage Vd input to an S input thereof goes high, and sets the Q output thereof at "L" level when the comparison voltage Vc input to an R input thereof goes high.

The OR circuit 72 performs an operation of the logical sum of the Q output of the RS flip-flop 71 and the switching signal Vsw, to be output.

The AND circuit 73 performs an operation of the logical product of the output of the inverter 70 and the output of the OR circuit 72, to be output.

The switching circuit 74 outputs a driving signal Vdr2 of "H" level, so as to turn on the NMOS transistor 22, while the output of the AND circuit 73 is high. On the other hand, the switching circuit 74 outputs the driving signal Vdr2 of "L" level, so as to turn off the NMOS transistor 22, while the output of the AND circuit 73 is low.

<<Operation of Driving Circuit 44 when Switching Signal Vsw is High>>

An operation of the driving circuit 44 when the switching signal Vsw is high will be described. When the switching signal Vsw is high, the output of the OR circuit 72 is high, and thus the output of the AND circuit 73 varies similarly to the output of the inverter 70. Therefore, the switching circuit 74 turns off the NMOS transistor 22 while the pulse signal Vp is high, and turns on the NMOS transistor 22 while the pulse signal Vp is low.

On the other hand, as described above, the switching circuit 60 turns on the NMOS transistor 21 while the pulse signal Vp is high, and turns off the NMOS transistor 21 while the pulse signal Vp is low. Therefore, the driving circuit 44 turns on/off the transistors 21 and 22 in a complementary manner, so as to cause the ripple converter 10 to operate as a power supply that employs the synchronous rectification system.

<<Operation of Driving Circuit 44 when Switching Signal Vsw is Low>>

When the switching signal Vsw is low, the output of the OR circuit 72 varies with the logical level of the Q output of the RS flip-flop 71.

When the comparison voltage Vc is high, the Q output of the RS flip-flop 71 is low, and thus the output of the AND circuit 73 is also low. Therefore, in this case, the switching circuit 74 keeps the NMOS transistor 22 off. In the case where the NMOS transistor 22 is kept off, when switching is performed for the NMOS transistor 21, a current flowing through the inductor 24 flows via the diode 23, for example.

Therefore, when the switching signal Vsw is low and the comparison voltage Vc is high, the driving circuit 44 causes the ripple converter 10 to operate as a power supply that employs the diode rectification system.

When the voltage Vd goes high, the Q output of the RS flip-flop 71 goes high, and thus the output of the OR circuit 72 goes high. Therefore, when the voltage Vd is high, the driving circuit 44 causes the ripple converter 10 to operate as a power supply that employs the synchronous rectification system, similarly to the case where the control signal Vcn is high.

As such, the driving circuit 44 basically causes the ripple converter 10 to operate as the power supply that employs the synchronous rectification system, when the switching signal Vsw of "H" level is input thereinto; and basically causes the ripple converter 10 to operate as the power supply that employs the diode rectification system, when the switching signal Vsw of "L" level is input thereto. However, even in the case where the switching signal Vsw of "L" level is input to the driving circuit 44, when it is detected that the pulse period is longer than the predetermined period TA, and the voltage Vd is high, the driving circuit 44 causes the ripple converter 10 to operate as the power supply that employs the synchronous rectification system.

==Operation of Ripple Converter 10==

A description will be given of an operation of the ripple converter 10 in three cases, for example, i.e., under heavy load conditions (when the load current is greater than or equal to 1 mA, for example), under light load conditions (when the load current is 100 μA to 1 mA, for example), and under almost no load conditions (when the load current is smaller than 100 μA, for example). It is assumed that whether the condition of the load 15 is a heavy load or a light load is determined by the load current detected by the micro computer (not depicted), for example. The micro computer outputs the switching signal Vsw of "H" level under heavy load conditions, and outputs the switching signal Vsw of "L" level under light load conditions.

The pulse period of the ripple converter 10, that is, the switching period becomes longer as the condition of the load 15 becomes closer to no load. In an embodiment of the present invention, it is assumed that when the load 15 is almost no load, for example, the pulse period detecting circuit 43 detects that the pulse period is longer than the predetermined period TA, and generates the pulse signal Vp.

<<When Condition of Load 15 is Heavy Load>>

Figure 3:
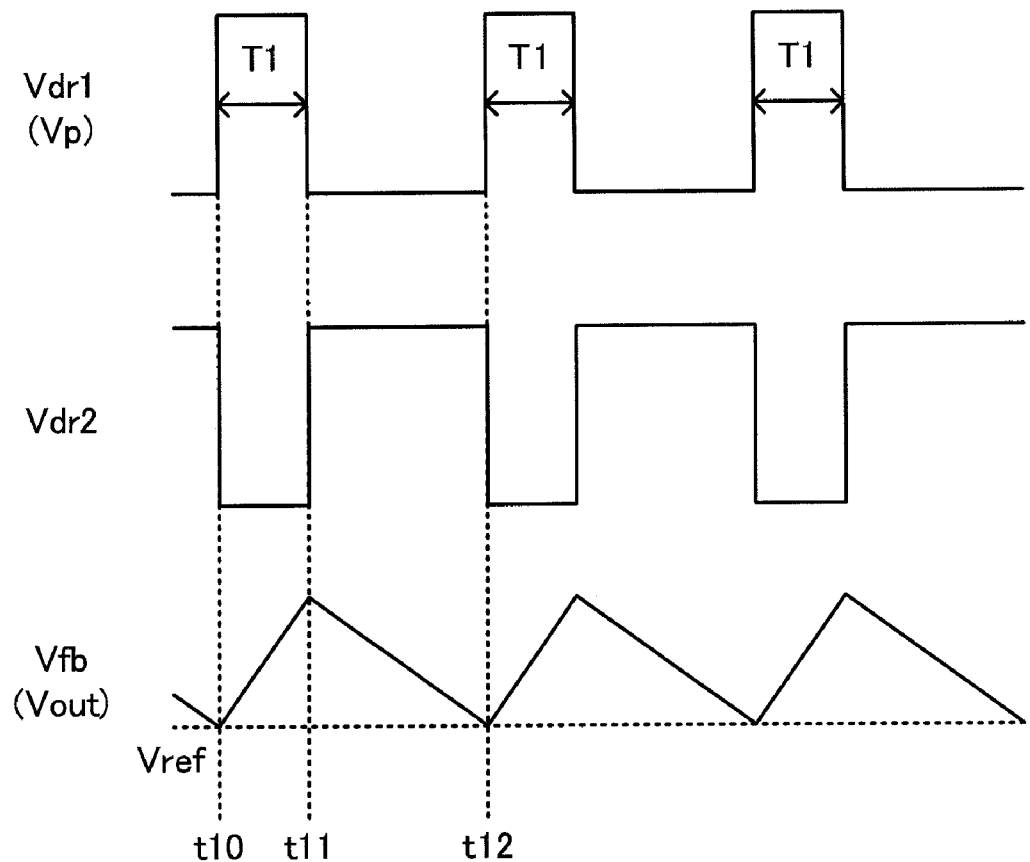
FIG. 3 is a diagram illustrating a main waveform of a ripple converter 10 under heavy load conditions.

A description will be given of operations of the ripple converter 10 when the condition of the load 15 is a heavy load, with reference to FIGS. 1 and 3. The switching signal Vsw is high under heavy load conditions, and thus the ripple converter 10 operates as the power supply that employs the synchronous rectification system.

For example, when the feedback voltage Vfb is lower than the reference voltage Vref at a time t10, the pulse signal Vp of "H" level is generated for a predetermined time period T1, and thus the NMOS transistor 21 is kept on for the predetermined time period T1 and the output voltage Vout is increased. At a time t11 after the predetermined time period T1 has passed from the time t10, the NMOS transistor 21 is turned off and the NMOS transistor 22 is turned on, and thus the output voltage Vout is reduced. When the feedback voltage Vfb becomes lower than the reference voltage Vref at a time 12, the NMOS transistor 21 is again kept on for the predetermined time period T1. Since the operations from the time t10 to the time t12 are repeated at the time t12 and thereafter, the output voltage Vout of a target level is generated.

<<When Condition of Load 15 is Light Load>>

Figure 4:
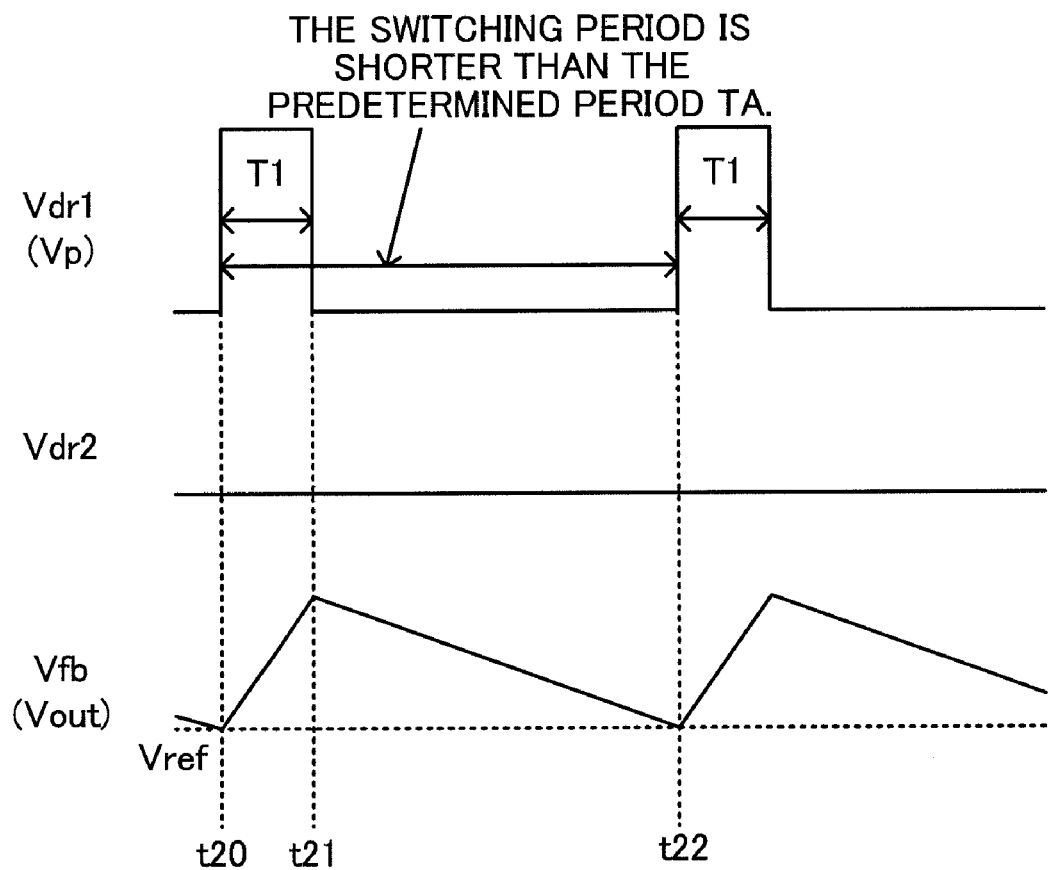
FIG. 4 is a diagram of a main waveform of a ripple converter 10 under light load conditions.

A description will be given of an operation of the ripple converter 10 under light load conditions, with reference to FIG. 4. As described above, the switching period under light load conditions is shorter than the predetermined period TA, and thus the voltage Vd never goes high. Therefore, under light load conditions, the ripple converter 10 operates as the power supply that employs the diode rectification system.

For example, when the feedback voltage Vfb becomes lower than the reference voltage Vref at a time t20, the pulse signal Vp of "H" level is generated for the predetermined time period T1, and thus the NMOS transistor 21 is kept on for the predetermined time period T1, and the output voltage Vout is increased. At a time t21 after the predetermined time period T1 has passed from the time t20, the NMOS transistors 21 and 22 are turned off. Therefore, the current of the inductor 24 flows via the diode 23, and the output voltage Vout is reduced. When the feedback voltage Vfb becomes lower than the reference voltage Vref at a time t22, the NMOS transistor 21 is again kept on for the predetermined time period T1. The operations from the time t20 to the time t22 are also repeated at the time t22 and thereafter, and thus the output voltage Vout of the target level is generated.

<<When Condition of Load 15 is Almost No Load>>

Figure 5:
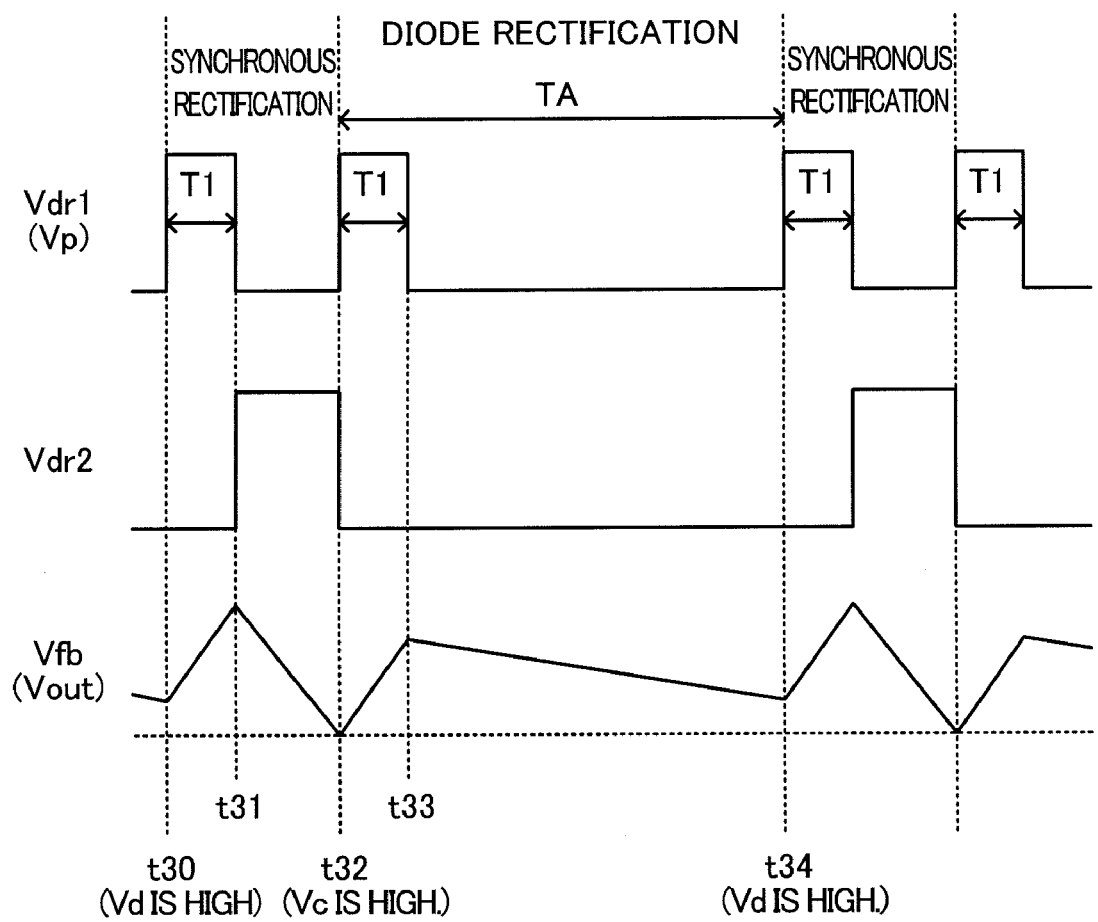
FIG. 5 is a diagram illustrating a main waveform of a ripple converter 10 under almost no load conditions.
Figure 6:
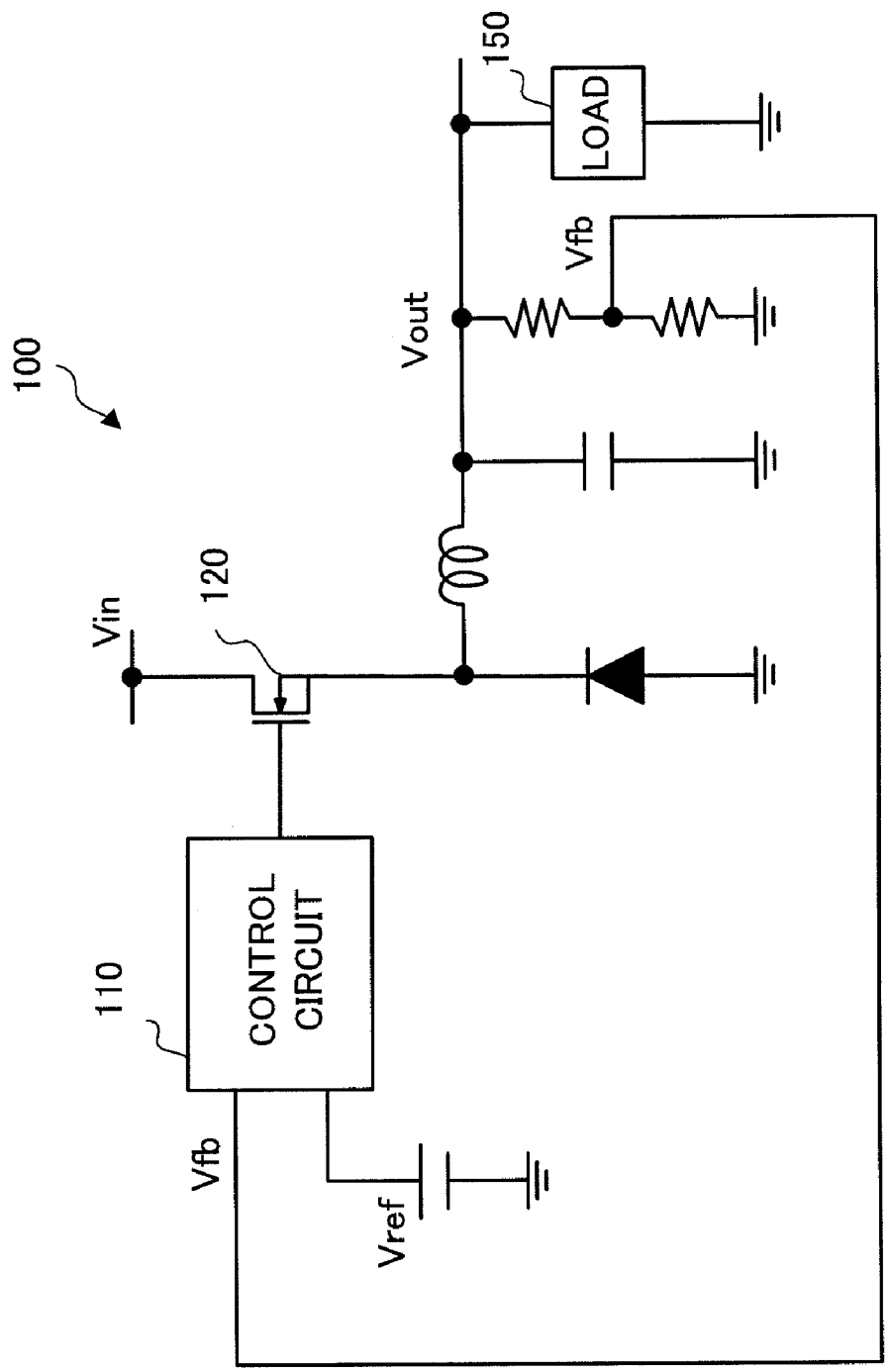
FIG. 6 is a diagram illustrating a configuration of a common ripple converter 100.

A description will be given of operations of the ripple converter 10 when the condition of the load 15 is almost no load, with reference to FIG. 5. As described above, the switching period under almost no load conditions is longer than the predetermined period TA, and thus it is detected that the pulse period is longer than the predetermined period TA, and the voltage Vd may be high. Therefore, under almost no load conditions, the ripple converter 10 operates as the power supply that employs the synchronous rectification system when the voltage Vd is high, and operates as the power supply that employs the diode rectification system when the comparison voltage Vc is high.

For example, when it is detected that the pulse period is longer than the predetermined period TA, and the voltage Vd goes high at a time t30, the ripple converter 10 operates as the power supply that employs the synchronous rectification system. Therefore, at the time t30, the NMOS transistor 21 is turned on and kept on for the predetermined time period T1 and the output voltage Vout is increased. At a time t31 after the predetermined time period T1 has passed from the time t30, the NMOS transistor 21 is turned off; the NMOS transistor 22 is turned on; and the output voltage Vout is reduced.

Thereafter, when the feedback voltage Vfb becomes lower than the reference voltage Vref at a time t32, the comparison voltage Vc goes high, and thus the ripple converter 10 operates as the power supply that employs the diode rectification system. Specifically, at the time t32, the NMOS transistor 21 is turned on and kept on for the predetermined time period T1. At a time t33 after the predetermined time period T1 has passed from the time t32, the NMOS transistors 21 and 22 are turned off. Therefore, the output voltage Vout is more mildly reduced from the time t33 to a time t34 than the output voltage Vout is reduced from the time t31 to the time t32.

At the time t34 after the predetermined period TA has passed from the time t33, it is detected that the pulse period is longer than the predetermined period TA, and thus the voltage Vd goes high and the NMOS transistor 21 is turned on. That is, at the time 34, the ripple converter 10 operates as the power supply that employs the synchronous rectification system. The operations from the time t30 to the time t34 are repeated at the time t34 and thereafter, and thus the output voltage Vout of the target level is generated.

Hereinabove, the ripple converter 10 according to an embodiment of the present invention has been described.

In a common ripple converter whose switching period is limited so as not to exceed the predetermined period, an output voltage may be increased. In an embodiment of the present invention, however, when it is detected that the switching period is longer than the predetermined period TA, the low-side NMOS transistor 22 is turned on, as depicted in a section between the times t31 and t32 in FIG. 5. Therefore, in an embodiment of the present invention, the increase of the output voltage Vout can be suppressed even in the case where the switching period is limited so as not to exceed the predetermined period TA.

Whether the switching period is longer than the predetermined period TA can also be detected by a common timer circuit that uses a constant current source, a capacitor, etc., for example. In general, the current value of the constant current source and the capacitance value of the capacitor may vary greatly. Therefore, when such a timer circuit is used, the precision with which to detect the switching period may suffer. In an embodiment of the present invention, the counter 50 is used for detecting the switching period, and elements having great variations, etc., such as a capacitor, are not used. Therefore, in an embodiment of the present invention, whether the switching period is longer than the predetermined period TA can accurately be detected.

In General, when the load 15 is a heavy load, the ripple converter 10 can achieve a high degree of efficiency by being operated as the power supply that employs the synchronous rectification system than by being operated as the power supply that employs the diode rectification system. In an embodiment of the present invention, when the switching signal Vsw is high, the ripple converter 10 operates as the power supply that employs the synchronous rectification system. Therefore, the efficiency of the ripple converter 10 can be improved, under heavy load conditions, for example.

For example, the NMOS transistors 21 and 22 that are power transistors may be integrated into the control IC 20. Even with a switching power supply circuit including such power transistors, the same effect can be acquired as that in an embodiment of the present invention.

The diode 23 is the body diode of the NMOS transistor 22. Therefore, as compared with the case where the diode 23 is separately provided, for example, the number of parts can be reduced in an embodiment of the present invention.

The above embodiments of the present invention are simply for facilitating the understanding of the present invention and are not in any way to be construed as limiting the present invention. The present invention may variously be changed or altered without departing from its spirit and encompass equivalents thereof.

The predetermined period TA may also be such a period that the switching frequency of the ripple converter 10 is not in the audible range, for example. Further, the predetermined period TA may also be such a period that electronic equipment including the ripple converter 10 does not malfunction, or such a period as to be determined based on the noise standards such as EMI (Electro-Magnetic Interference) and EMC (Electro-Magnetic Compatibility).

What is claimed is:

1. A switching control circuit configured to perform switching so as to cause a first transistor to be turned on and kept on for a predetermined time period, in order to generate an output voltage of a target level out of an input voltage, the first transistor having an input electrode to be applied with the input voltage and an output electrode connected to an inductor and a diode, the switching control circuit comprising:
   a comparison circuit configured to compare a feedback voltage corresponding to the output voltage with a reference voltage;
   a detecting circuit configured to detect whether a switching period of the first transistor is longer than a predetermined period; and
   a driving circuit configured to
      turn off a second transistor connected in parallel to the diode as well as turn on the first transistor to be kept on for the predetermined time period, and thereafter, turn off the first transistor and the second transistor, when the feedback voltage becomes lower than the reference voltage, and
      turn off the first transistor as well as turn on the second transistor, when the switching period becomes longer than the predetermined period.

2. The switching control circuit of claim 1, wherein
in a case where a signal for turning on/off the first transistor and the second transistor in a complementary manner is input to the driving circuit, when the feedback voltage becomes lower than the reference voltage, the driving circuit turns off the second transistor as well as turns on the first transistor to be kept on for the predetermined time period, and thereafter, turns off the first transistor as well as turns on the second transistor.

3. The switching control circuit of claim 1, wherein
the detecting circuit includes a counter configured to change a count value in synchronization with a clock signal, and to be reset when the first transistor is turned on, and wherein
the driving circuit turns off the first transistor as well as turns on the second transistor, when the count value reaches a predetermined value indicative of the predetermined period.

4. The switching control circuit of claim 3, wherein
in a case where a signal for turning on/off the first transistor and the second transistor in a complementary manner is input to the driving circuit, when the feedback voltage becomes lower than the reference voltage, the driving circuit turns off the second transistor as well as turns on the first transistor to be kept on for the predetermined time period, and thereafter, turns off the first transistor as well as turns on the second transistor.

5. A switching power supply circuit configured to perform switching so as to cause a first transistor to be turned on and kept on for a predetermined time period, in order to generate an output voltage of a target level out of an input voltage, the first transistor having an input electrode to be applied with the input voltage and an output electrode connected to an inductor, the switching power supply circuit comprising:
a diode connected to the output electrode;
a second transistor connected in parallel to the diode;
a comparison circuit configured to compare a feedback voltage corresponding to the output voltage with a reference voltage;
a detecting circuit configured to detect whether a switching period of the first transistor is longer than a predetermined period; and
a driving circuit configured to
turn off a second transistor as well as turn on the first transistor to be kept on for the predetermined time period, and thereafter, turn off the first transistor and the second transistor, when the feedback voltage is lower than the reference voltage, and
turn off the first transistor as well as turn on the second transistor, when the switching period is longer than the predetermined period.

6. The switching power supply circuit of claim 5, wherein the second transistor includes a MOS transistor, and
the diode includes a body diode of the MOS transistor.

* * * * *